United States Patent Office 3,475,196
Patented Oct. 28, 1969

3,475,196
PRESSURE-SENSITIVE TAPE COATED WITH A RELEASE AGENT
Charles Bartell, Highland Park, Ivan Cutukovic Milutin, Chicago, Jules Downes Porsche, Clarendon Hills, and Robert John Rolih, Joliet, Ill., assignors to Borden, Inc., New York, N.Y., a corporation of New Jersey
No Drawing. Filed Dec. 27, 1965, Ser. No. 516,730
Int. Cl. B44d 1/12, 1/09
U.S. Cl. 117—68.5                      13 Claims

ABSTRACT OF THE DISCLOSURE

This invention relates to pressure-sensitive adhesive tapes comprising a backing, a pressure-sensitive adhesive applied to at least one side of said backing, and a poly-N-acyl-imine release coating agent which is an acyl derivative of a polyalkylene amine applied to an adhesive coated side of said backing, or a side of said backing not coated with adhesive or to both.

---

Release coating agents are generally used to reduce the adhesive bonding force between pressure sensitive adhesives and other surfaces. The release property is especially desirable in adhesive tape rolls where the adhesive surface is rolled on the upper surface of adjacent layer of tape. The adhesive surface should have sufficient adhesion to the other surface to keep the roll from "telescoping" but yet not so much as to prevent pulling away from the other surface without loss of adhesive to that surface. It has been found, however, that after extended contact of these surfaces, particularly at elevated temperatures, undesirable side effects are noted. The adhesive loses some of the adhesive bonding force thereby causing the "telescoping" effect in the rolls and other deleterious effects on the properties of the pressure sensitive adhesive.

Another disadvantage of known release agents is the low viscosity of their solutions in organic solvents. This makes difficult the application of release agents to smooth surfaces used in making pressure-sensitive tapes, as for example, metal foils, thermoplastic films, etc. Also the low viscosity solutions permit penetration of porous backings, such as paper and cloth when these materials are used in the manufacture of pressure-sensitive tapes. Penetration thereby results in economic loss since the only portion of the release agent which is effective is that which is on the surface and contacts the adhesive when the finished tape is rolled on itself.

The present invention provides a pressure-sensitive adhesive tape comprising a release coating agent of poly-imine-amide type hereinafter described. The pressure sensitive adhesive tape unwinds easily after storage in a warm place and the adhesive exhibits substantially unimpaired tack and adhesion. "Telescoping" is essentially eliminated in tape rolls.

The invention further provides release agents which form thixotropic solutions in certain organic solvents, such as liquid aromatic hydrocarbons, so that continuous, uniform layers of release agent may be applied to smooth surfaces of tape backing materials. The thixotropic character of the solutions is also valuable in minimizing penetration of porous taps backings such as paper or cloth.

A further advantage of the instant invention is that the release agents of this invention are effective at lower concentrations and in smaller quantities than previously known agents. The use of these new agents in the manufacture of pressure-sensitive tapes is therefore accompanied by an economic advantage as well as improvement in performance of the tapes.

Briefly stated, the present invention comprises a pressure-sensitive adhesive tape which includes pressure-sensitive adhesive, backing material and polyimine-amide release coating agent hereinafter described. There may optionally be included a primer coating on one surface of the backing material in order to improve its surface bonding characteristics to pressure-sensitive adhesive which is applied thereon. Also, a base coat may be included on the other surface of the backing material in order to improve the bonding characteristics of that surface to release coating agents applied thereon.

The polyimine-amide is a poly-N-acyl-imine which may be regarded as an acyl derivative of a polyalkylene amine having a straight or branched chain, or an acyl derivative of a polyamide of a polyalkylene amine and a dicarboxylic acid wherein said polyamide has a plurality of primary or secondary amino groups. The polyimine-amide has the following general structural formula:

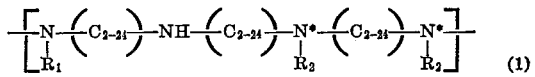   (1)

wherein $R_1$ is a connector group between amine groups. $R_1$ may be:

(a) The dicarboxylic moiety of aromatic or aliphatic dicarboxylic acids such as:

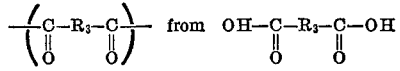

wherein $R_3$ is selected from the group consisting of aromatic, aliphatic, combinations thereof, and in the case of oxalic acid the carboxylic carbon atoms are connected directly to each other;

(b) The hydroxy derivative of an oxirane moiety such as:

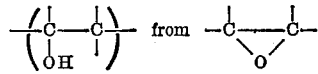

(c) A $C_{2-24}$ hydrocarbon moiety selected from the group consisting of aliphatic and aromatic-aliphatic group having between 2–24 carbon atoms.

The average number of carbon atoms in the $R_1$ groups is a maximum of 20, as determined by the quotient of the total number of carbon atoms in all $R_1$ groups in the polymer chain divided by the total number of basic nitrogen atoms attached to $R_2$ groups in the polymer chain. Basic nitrogen atoms are shown by asterisks. In cases where $R_1$ is a hydrocarbon moiety, the nitrogen atom attached thereto is also considered basic. The chain length of the polymer is regulated by the proportion of connector groups. The molecular weight of the backbone polymer, i.e., the structure shown in Equation 1 above without the $R_2$ groups, is between 100 and up to about 200,000 and greater.

$R_2$ is selected from the group consisting of hydrogen, a $C_6$–$C_{24}$ acyl, carbamoyl, and carboalkoxy (which may also be referred to as "oxy" for convenience) group derived from a straight chain alkyl hydrocarbon, such as:

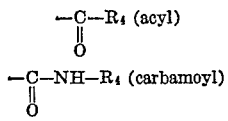

and

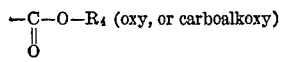

wherein $R_4$ is an alkyl hydrocarbon moiety having between 3 and up to 24 carbon atoms, preferably as a straight chain moiety.

Examples of $R_1$ groups which separate nitrogen atoms and which are connections for amine groups, include:

(a) Dicarboxylic acid moieties of $C_2$–$C_{18}$ dicarboxylic aromatic, aliphatic or combinations thereof, acids such as oxalic, succinic, pimelic, sebacic, brassylic, phthalic, and acids containing up to 16 carbon atoms between the carboxylic acid groups;

(b) Hydroxy containing moieties of epoxy and hydroxyepoxy compounds having up to 18 carbon atoms in the compound. The epoxy compound is preferably $C_2$–$C_{18}$ aliphatic, cycloaliphatic, aromatic or heterocyclic and may be substituted with noninterfering groups such as halogen atoms. The hydroxyepoxy compounds are $C_3$–$C_{18}$ compounds of the class described for epoxy compounds which preferably are monohydric having the hydroxy group in the terminal position. The following examples of the hydroxyepoxy are applicable as examples of the epoxy compounds with the hydroxyl group removed and the valence bond property substituted: 2,3-epoxypropanol (glycidol), 3,4-epoxybutanol, 2,3-epoxyhexanol, epoxidized octadecadienol, 2,3-dimethyl-4,5-epoxyoctanol, 2-methoxy-4,5-epoxyoctanol, 3,4-epoxy-5-chlorocyclohexanol, 2,3-epoxypropoxypropanol, 2,3-epoxypropoxyhexanol, 2,3-epoxydodecanol, 4-chloro-5,6-epoxydodecanol, 3,4-epoxydodecanol, 2,3-epoxycyclohexanol, 2,3-epoxy-5-octanol, 2,3-epoxy-6-dodecanol, 2,3-epoxypropoxy-5-octenol and 2,3-epoxypropoxy-4-cyclohexanol.

(c) $C_{2-24}$ hydrocarbon groups such as ethylene, propylene, butylane, hexylene, dodecylene, octadecylene, tetracosylene, phenylene, piperazyl, cyclohexylene, combinations thereof, and including bivalent radicals having a methylene group attached to a cyclic radical, e.g.,

and the like.

Examples of $R_2$ include tetracosanoyl, stearoyl, lauroyl, hexanoyl, carbostearoxy, carbodecanoxy, octadecylcarbamyl, dodecylcarbamyl, and the like.

Up to 100% of the primary and secondary amino nitrogen atoms as shown in Equation 1, are bound to the acyl groups described. Preferred, however, is acylation in the range of 60%–100%.

It is critical to note that basic NH and $NH_2$ groups react readily with acylating agents such as octadecyl isocyanate and stearoyl chloride and the like, with consequent formation of long chain alkyl substituted ureas or amides. While this reaction occurs readily with secondary and primary amines, it does not take place under ordinary conditions when the NH or $NH_2$ group is present in an amide linkage. The latter amide linkage is present when $R_1$ is a dicarboxylic acid moiety.

Typical of the release agents discovered are compounds such as: N-alkanoyl polyamides; N-alkyl carbamoyl polyamides; N-alkyl carbamyl polyamides; N-alkanoyl, N-alkyl carbamyl or N-alkyl carbamoyl derivatives of polybutyleneimine, decyleneimine, phenyleneimine, piperazyl ethyleneimine, benzylene imine, xylylene imine, and the like. Specific examples include: octanoyl, lauroyl, and stearoyl polyethyleneimine; tetracosanoyl tetraethylenepentamine; carbopalmitoxypolyethyleneimine; octadecyl carbamyl polyethyleneimine.

While the acyl derivatives of diethylenetriamine and triethylenetetramine exhibit release properties, the solubility and film forming properties of these materials are poor. It has been found that polyalkylimines in the higher molecular weight range are the desired starting materials for the release coating agents of this invention. The range of about at least 100 and up to and greater than 100,000 is preferred. Especially suitable is the low cost and readily available material, polyethyleneimine.

As to the backing material, any material ordinarily used for this purpose may be used in connection with this invention. The particular material chosen is dependent upon the end use for the pressure sensitive adhesive tape. The backing should have sufficient mechanical strength, humidity resistance, temperature insensitivity and other qualities, so as to be suitable for the particular purpose for which the tape was designed. Examples of backing material include fibrous and nonfibrous materials which may be made by weaving, compounding, extruding, etc., as for example, the backing material includes: paper, cotton and other cellulosic materials, plastics such as acetates, vinyl halides, polyalkylene and polyester films, glass fabrics, metal foils, etc.

As to the pressure-sensitive adhesive, it comprises elastomeric material such as natural or synthetic rubber, and may include resinous components known as tackifying agents. Other additives well known in the art may be added to the pressure-sensitive adhesive formulation such as fillers, anti-oxidants, plasticizers, and the like.

Elastomeric materials, are of the class including natural and synthetic rubbers. Examples of such elastomers include polyisobutylene, polybutadiene, polychloroisoprene, polyisoprene and ethylene-propylene polymers, polyvinyl $C_1$–$C_4$ ethers, copolymers of butadiene and acrylonitrile, butadiene and styrene, polyacrylates, and other synthetic and natural rubbers or elastomers. The elastomers described may be used separately or in combination.

Tackifying agents are added in order to provide adherence to surfaces applied without application of appreciable pressure. Examples of such tackifying agents include polyterpene resins, hydrocarbon resins, polymerized or disproportionated rosin esters, wood rosin, oil soluble phenolic resins, and the like.

Other components of the pressure-sensitive adhesive include fillers, examples of which are clays, diatomaceous earth, silica, talc, zinc oxide, calcium carbonate, etc.; antioxidants, as for example, polyhydric phenols and their alkyl derivatives, diaryl amines, metal chelating agents, etc.; and plasticizers such as mineral oil, lanolin, liquid polybutenes, or polyacrylates.

Optionally, primers which improve the bonding characteristics of certain backing material surfaces for better adhesion of the pressure-sensitive adhesive thereto, may be used. These include natural and synthetic elastomers which can be applied in solution or in latex form. Also, the optional base coat for the other surface of the backing material includes both thermoplastic and thermosetting coating resins such as alkyds, vinyls, acrylics, etc.

The pressure-sensitive adhesive is preferably applied to the backing material which may or may not have a primer coating thereon in the form of a solvent solution or emulsion. The solvent may be any solvent for the particular pressure-sensitive adhesive, including aromatics such as benzene, toluene and xylene, aliphatics such as low boiling naphthas, hexane, pentane and the like, ketones such as methyl ethyl ketone and methyl isobutyl ketone, and chlorinated hydrocarbons such as chlorobenzene, trichloroethylene, ethylene dichloride, and carbon tetrachloride. Alcohols and water or other polar solvents may be used when applicable as a solvent or emulsifying medium for the adhesive.

The pressure-sensitive adhesive is generally prepared by disolving the elastomeric material in a solvent, or dispersing it in an emulsifying solution. To the adhesive mixture may be added the various additives, as for example, the tackifying agent, plasticizer, antioxidant and filler. The components are blended in the solvent or emulsified until smooth. Heat may be required to achieve a uniform solution or dispersion.

The adhesive composition is applied to the backing material (which may first have been coated with a primer coating), by any convenient method, as by calendering, extrusion, kiss-roll coating, etc. It is convenient to apply the various coating surfaces to the backing material in one operation. Generally, the primers, adhesive composition and release coating are applied to the backing material in sequence. A most convenient method is by continuous movement of a film of backing material through the various application zones. The solvents or emulsifying liquids are removed from the tape as by evaporation by heating in the application and evaporation zones. The tape is then generally wound on itself for storage.

The weight of pressure-sensitive adhesive composition on a dry basis is preferred to be in the range of between about 3 and 100 grams per square yard of backing material, but may be outside this range if required for specific purposes. The thickness of the backing material is usually greater than 0.5 mil.

The release coating is prepared by one of several methods, as for example, reaction of a polyalkyleneimine, polyalkeneiminepolyamide or polyol, with a straight chain fatty acyl chloride in the presence of a halogen acid removing agent, such as tertiary amine or caustic; by dehydration of fatty acid salts of a polyalkyleneimine; and by reaction of polyalkyleneimine with a fatty acid ester. Straight chain isocyanates may be used to form the alkyl carbamyl derivatives instead of the carbamoyl chlorides. Preparation of the release coating will be described in connection with the reaction of straight chain fatty acid halides with a polyalkyleneimine.

The desired polyalkyleneimine, or mixtures of polyalkyleneimines, or polyalkyleneiminepolyamides or polyols having an average of not more than 20 carbon atoms between nitrogen atoms as discussed above, are dissolved in a teritary amine such as pyridine. The solution is heated to boiling to remove moisture. The resulting solution of an anhydrous polyalkyleneimine in the acid absorbing material is treated with a straight chain fatty acid halide. The mixture is stirred under reflux, since the reaction is mildly exothermic. After the reaction has been completed, as judged by a fall in temperature, heating is continued for 2-3 hours to insure completion of the reaction. The mixture is then combined with an alcohol, such as methanol. The precipitate which forms is separated from the alcohol-pyridine mixture. The precipitate, which is the poly-N-acyl-imine, is washed several times with alcohol and/or ether and dried.

An alkyl isocyanate may be substituted for a fatty acid halide in this process.

Application of the poly-N-acyl-imine to the surface of the backing material may be accomplished by dissolving the imine release coating agent in a suitable solvent such as for example, the aromatic solvents xylene and toluene, and applying the solution to the backing material in any convenient manner, as by treating a continuous tape with the solution. The solvent solution may be in proportion, as desired, and is not critical. However, for convenience of handling, a 0.1%-5% weight solution is preferred. The solvent is removed as by evaporation, leaving a thin film of the poly-N-acyl-imine on the backing material. The release coating may also be applied from an emulsion of the poly-N-acyl-imine in a suitable nonsolvent such as water. The solvent is the preferred carrier.

The preferred solvents for all of the release agents of this invention are the aromatic hydrocarbons toluene and xylene because their vapor pressure ranges are particularly adaptable to the manufacture of pressure-sensitive tapes. Benzene can be used, but it is somewhat too volatile and solutions of the release agents in benzene evaporate too rapidly and may, at high temperatures, cause difficulty in obtaining a uniform distribution of the release agent on the backing material. Conversely, aromatic hydrocarbons having higher boiling points, such as methyl naphthalenes, evaporate too slowly and appreciable quantities of solvent remain in the finished pressure sensitive tape.

Monochlorobenzene may also be used, especially for the lower molecular weight release agents. Other chlorinated aromatics tend to have boiling points that are somewhat too high and will, therefore, be incompletely removed in the process of manufacturing the tapes, especially where high speed production is desired.

Pyridine may also be used as solvent, but it has an objectionable odor and is, therefore, not preferred.

Chloroform is also usable, although there is some evidence that a reaction may occur between chloroform and some of the release agents described, upon prolonged standing of the solution.

Esters boiling in the range of 100 to 150° C. may be used, as for example butyl acetate.

Alcohols and ketones having similar boiling ranges have not proven overly satisfactory, although they may be used for some of the release agents described, especially in mixtures with the preferred solvents.

Molecular weights of the release agents may range from a minimum of about 300 to 1,000,000 or more.

The invention will be further illustrated by description in connection with the following specific examples of the practice of it. The proportions here and elsewhere herein are expressed as parts by weight unless specifically stated to the contrary.

EXAMPLE I

Preparation of poly-N-acyl-imine

An aqueous solution of 42 grams (1.0 equivalent) of polyethyleneimine of molecular weight approximately 100,000 and 89 grams of water was dehydrated by distillation from 2 liters of anhydrous isopropanol. After removal of the water, an excess of pyridine was added and the residual isopropanol removed by fractional distillation. The pyridine solution was treated with 234 grams (0.8 mol) of stearoyl chloride. After stirring for two hours, the mixture was poured into 8 liters of methanol. The precipitate which formed was separated and washed thoroughly with methanol, and then air dried. The yield of dry poly-N-stearoylimine was 245 grams and softened at 58° C.

EXAMPLE II

A poly-N-acyl-imine is prepared as in Example I, except that the polyethyleneimine is replaced by polyethyleneimine of M.W. 30-40,000. 4.2 grams of this imine were reacted with 30.2 g. (0.1 mol) of stearoyl chloride, according to the procedure outlined in Example I. 28 grams of dry poly-N-stearoyl-imine were obtained. S.P. 59° C.

In variations of this procedure, polyalkyleneimines of the kind herein previously described are used to prepare particular imines. The molecular weight of the imines is varied over the range 100–150,00.

EXAMPLE III

A poly-N-acyl-imine is prepared as in Example I, except that the stearoyl chloride is replaced in like molar proportion by octadecyl isocyanate. 17.6 g. of dehydrated polyethyleneimine, M.W. ca. 100,000, was dissolved in pyridine and was reacted with 121 g. of octadecyl isocyanate. The isocyanate was added in small portions to the boiling pyridine solution. After cooling to room temperature, by addition of an excess of methanol, precipitation of the reaction product was effected. After air drying, the polyoctadecyl carbamide weighed 135 g. and softened at 63° C.

EXAMPLE IV

A poly-N-acyl-imine is prepared as in Example I, except that the polyethyleneimine is replaced by tetraethylenepentamine and a five mole proportion of stearoyl chloride is used. The pentastearoyl derivative has a softening point of 75° C.

EXAMPLE V

Preparation and application of the release coating

The release agent of Example I was employed in the manufacture of a standard paper masking tape having an aggressively tacky natural rubber based pressure-sensitive adhesive. The polyimine amide was dissolved in toluene at 1.5% and 3.0% concentrations. It was applied to the tape backing using a kiss-roll coater and a Mayer bar. The web, coated with adhesive on one side and release coating agent on the other, was caused to pass through a heated oven to evaporate solvents and was then rolled upon itself in the manner customary in the manufacture of pressure-sensitive tapes.

Three variations in quantity of release agent were used. Mayer Bars No. 0 and 12 were used in applying the 3.0% solution (rolls 1 and 2) and a Mayer Bar No. 0 was used in applying the 1.5% solution (roll 3).

Samples of the finished tape were tested for adhesion to steel and 90° tack immediately after manufacture and after storage in roll form under the conditions described below. The force necessary to unwind the rolls was determined at various unwind speeds. The following results were obtained:

TABLE I

|  | Adhesion (oz./in.) | | |
| --- | --- | --- | --- |
|  | Roll 1 | Roll 2 | Roll 3 |
| Immediate, shelf | 45 | 40 | 44 |
| 3 days, shelf | 44 | 41 | 42 |
| 12 days, shelf | 44 | 40 | 44 |
| 3 days, 120° F | 38 | 40 | 42 |
| 12 days, 120° F | 42 | 43 | 44 |

TABLE II

|  | 90° Tack (oz./in.) | | |
| --- | --- | --- | --- |
|  | 1 | 2 | 3 |
| Immediate, shelf | 17 | 15 | 17 |
| 3 days, shelf | 15.5 | 15 | 15 |
| 12 days, shelf | 15 | 14 | 14 |
| 3 days, 120° F | 14 | 14 | 12 |
| 12 days, 120° F | 14 | 16 | 13 |

TABLE III.—AGING CONDITIONS, DAYS

|  | Speed (feet/min.) | Unwind Force. (oz./in.) | | | |
| --- | --- | --- | --- | --- | --- |
|  |  | Shelf | | 120° F. | |
|  |  | 3 | 12 | 3 | 12 |
| Rolls: |  |  |  |  |  |
| 1 | 1 | 17 | 19 | 20 | 19 |
|  | 16 | 8 | 8 | 8 | 10 |
|  | 160 | 6 | 3 | 4 | 6 |
| 2 | 1 | 19 | 19 | 22 | 23 |
|  | 16 | 19 | 17 | 24 | 18 |
|  | 160 | 14 | 11 | 14 | 16 |
| 3 | 1 | 35 | 36 | 36 | 40 |
|  | 16 | 62 | 66 | 66 | 76 |
|  | 160 | 66 | 80 | 77 | 100 |

In order to compare the efficiency of polyimine amides of varying molecular weights and degrees of substitution, a simple screening test was devised. It was carried out as follows:

A. *Solution preparation.*—The polyimine amides were dissolved by stirring and, if necessary, by slightly warming a suspension in a suitable solvent, such as toluene or xylene. Some of the lower molecular weight polyimine amides, such as those derived from diethylenetriamine and tetraethylenepentamine, exhibited poor solubility. In these instances, mixtures of solvents such as N-butanol-chlorbenzene were employed and it was necessary to use the solutions at elevated temperatures. In general, all polyethyleneimine derivatives having a molecular weight of 1000 or more showed good solubility in the aromatic solvents. The maximum workable concentrations were in the range of 5%, due to thixotropy and high viscosity at higher levels of concentration.

Comparisons were made at 0.5, 1.5 and 3% concentrations.

B. *Coating procedure.*—A metering bar (Mayer Bar No. 0) was placed over a strip of a plastic film of a type normally used as a backing for pressure-sensitive tapes, and pressed against the film. Polymer solution was poured along the bar and the film was pulled in the opposite direction, with the result that an even layer of solution was applied to the film. It was found that the resulting very thin coating dried very rapidly in air, so that no heating was employed to remove solvent.

Three backing materials were used for this evaluation:
 (1) Polyethylene coated cloth,
 (2) Mylar 200 A (Du Pont),
 (3) Triacetate (Kodacel TA404–100).

C. *Release measurements.*—One inch wide strips of masking tape, with an adhesive showing 30 to 35 ounces per inch of adhesion, were placed over the coated substrate. A four and one half pound roller was rolled over the tape once in the direction perpendicular to the strip, and once in a direction along the strip.

Samples of uncoated film were treated in exactly the same manner.

All samples were equilibrated, first by placing in an oven at 120° F. for 72 hours and then allowing them to remain at room temperature for four to eight hours.

Tapes were then stripped from their substrates by fastening an end of the tape to a spring scale with a maximum indicator. The tapes were then peeled at an angle of approximately 180° at three speeds. Slow speed ranged from one to four feet per minute, medium speed four to twelve feet per minute, and high speed twelve to sixteen feet per minute.

The ratios of peel force from coated substrate to the peel force from uncoated substrate was determined for each sample and for each speed of peel.

It was observed that the ratios changed very little with speed and were, therefore, averaged for each thickness of release agent and backing.

After the tape was removed, a standard adhesion value to steel was measured.

The results of these tests are reported in the following table.

It is generally agreed among those skilled in the art that under the conditions of C above, a good release agent will reduce the unwind force for a roll of tape between .5 and .7 of the unwind force without release agent.

The numerals in parentheses indicate the example number previously described; the plus sign indicates that the percent side chains attached was at least that shown; PEI is polyethyleneimine; DETA is diethylenetriamine; and TEPA is tetraethylenepentamine.

TABLE IV

| Type of Derivative: | Theor. Percent of Side Chains Attached | Backbone and Molecular Weight | Backing Material | | | | | | | | |
|---|---|---|---|---|---|---|---|---|---|---|---|
| | | | Polyethylene | | | Polyester-Mylar | | | Triacetate | | |
| | | | 0.5[1] | 1.5[1] | 3.0[1] | 0.5 | 1.5 | 3.0 | 0.5 | 1.5 | 3.0 |
| Urea | 100 | PEI-1,000 | .825 | .818 | .720 | .850 | .832 | .706 | .829 | .694 | .717 |
| Do | 100 | PEI-40-60,000 | .770 | .586 | .496 | .809 | .691 | .603 | .716 | .573 | .589 |
| Urea (III) | 100 | PEI-100,000 | .827 | .665 | .585 | .838 | .749 | .550 | .926 | .716 | .589 |
| Urea | 80+ | PEI-30-40,000 | .464 | .376 | .378 | .570 | .518 | .458 | .600 | .347 | .199 |
| Do | 80+ | PEI-100,000 | .931 | .776 | .497 | .926 | .910 | .769 | .907 | .642 | .643 |
| Do | 60+ | PEI-100,000 | .671 | .555 | .417 | .887 | .832 | .773 | .760 | .370 | .372 |
| Do | 40+ | PEI-100,000 | .890 | .702 | .572 | .870 | .852 | .705 | .772 | .586 | .482 |
| Do | 20+ | PEI-100,000 | .977 | .886 | .756 | .954 | .902 | .834 | .859 | .808 | .580 |
| Do | 100 | DETA | .886 | .911 | .915 | 1.04 | 1.08 | 1.09 | .951 | .980 | .956 |
| Do | 100 | TEPA | .841 | .949 | .881 | 1.03 | .930 | .929 | 1.06 | 1.00 | 1.03 |
| Amide | 100 | PEI-1,000 | .863 | .763 | .614 | .964 | .801 | .590 | .981 | .891 | .746 |
| Do | 100 | PEI-40-60,000 | .714 | .587 | .516 | .773 | .674 | .733 | .863 | .842 | .723 |
| Amide (II) | 100 | PEI-30-40,000 | .818 | .700 | .530 | .965 | .871 | .618 | .937 | .863 | .697 |
| Amide | 100 | PEI-100,000 | .692 | .654 | .622 | .724 | .730 | .663 | .795 | .788 | .688 |
| Amide (I) | 80+ | PEI-100,000 | .810 | .709 | .584 | .839 | .744 | .651 | .861 | .838 | .706 |
| Amide | 60+ | PEI-30-40,000 | | .535 | .384 | .799 | .742 | .354 | .955 | .909 | .378 |
| Do | 60+ | PEI-40-60,000 | 1.08 | .711 | .475 | .800 | .681 | .472 | .800 | .909 | .486 |
| Do | 60+ | PEI-100,000 | 1.09 | .723 | .560 | .798 | .700 | .453 | 1.04 | .622 | .393 |
| Amide (IV) | 100 | TEPA | .842 | .853 | .972 | 1.00 | 1.02 | 1.03 | 1.02 | 1.05 | 1.13 |

[1] Percent solids.

From the data presented in Table IV, it can be seen that polyimine amides can be made which exhibit a tremendous variation in release efficiency. It is possible to prepare coatings so efficient that rolls of tape will unwind with almost no effort. Others exhibit varying degrees of efficiency almost to the vanishing point. The polyimine amides, therefore, permit the manufacturer of pressure-sensitive tapes to design a release coating which will fit precisely the requirements of a given application.

Another important and valuable characteristic of the polyimine amides, namely their ability to bond tenaciously to such varied substrates as those used in the experiment just described, is demonstrated by the fact that the adhesive tapes removed from the coated substrates in these experiments uniformly showed no reduction in tack and adhesion.

It may be desirable to prepare the release coating agent as a blend with coating materials which may or may not have release properties themselves. For example, certain thermoplastics such as vinyls and acrylates could be used.

It will be understood that it is intended to cover all changes and modifications of the examples of the invention herein chosen for the purpose of illustration which do not constitute departures from the spirit and scope of the invention.

We claim:

1. A pressure-sensitive adhesive tape comprising a backing of paper, cloth, film, or foil material, a pressure-sensitive adhesive applied to one side of said backing, and a poly-N-acyl-imine release coating agent which is an acyl derivative of a polyalkylene amine applied to the other side of said backing.

2. A pressure-sensitive adhesive tape comprising a backing of paper, cloth, film or foil material, a pressure-sensitive adhesive applied to one side of said backing, and a poly-N-acyl-imine release coating agent applied to the other side of said backing and having the general structural formula:

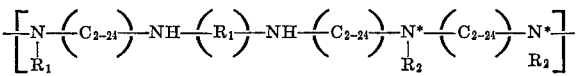

wherein:
(1) the asterisks denote basic nitrogen atoms;
(2) $R_1$ is a connector group between amine groups, having a maximum of 20 carbon atoms calculated as described, and said $R_1$ being selected from the group consisting of:
  (a) dicarboxylic moiety of aromatic or aliphatic dicarboxylic acid;
  (b) hydroxy derivative of oxirane moiety; and
  (c) $C_{2-24}$ hydrocarbon moiety;

(3) $R_2$ being selected from the group consisting of:
  (a) hydrogen;
  (b) $C_6$–$C_{24}$ acyl;
  (c) $C_6$–$C_{24}$ carbamoyl; and
  (d) $C_6$–$C_{24}$ oxy group derived from straight chain alkyl hydrocarbon; and
(4) the molecular weight of said agent is at least 300.

3. The tape of claim 2 wherein:
(1) $R_1$ is said dicarboxylic moiety having the general structural formula:

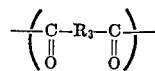

and wherein $R_3$ is selected from the group consisting of:
  (a) aromatic;
  (b) aliphatic;
  (c) aromatic-aliphatic combinations; and
  (d) where said carboxy carbon atoms are directly bonded to one another, $R_3$ is nonexistent.

4. The tape of claim 2 wherein $R_1$ is said oxirane moiety having the general structural formula:

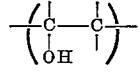

5. The tape of claim 2 wherein $R_1$ is said dicarboxylic moiety and is a $C_2$–$C_{18}$ dicarboxylic acid moiety containing up to 16 carbon atoms between said dicarboxylic acid groups, and having the general structural formula:

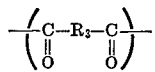

wherein $R_3$ is selected from the group consisting of up to $C_{16}$:
  (a) aromatic;
  (b) aliphatic;
  (c) aromatic-aliphatic combinations; and
  (d) where said dicarboxylic acid is a $C_2$ acid, $R_3$ is nonexistent.

6. The tape of claim 5 wherein said dicarboxylic acid moiety are derived from dicarboxylic acids selected from the groups consisting of:
  (1) oxalic;
  (2) succinic;
  (3) pimelic;
  (4) sebacic;
  (5) brassylic; and
  (6) phthalic.

7. The tape of claim 2 wherein $R_1$ is said hydroxy derivative moiety and is derived from an epoxy or hydroxyepoxy compound having up to 18 carbon atoms.

8. The tape of claim 7 wherein said epoxy compound is selected from the group consisting of: (1) $C_2$–$C_{18}$ aliphatic; (2) up to $C_{18}$ cycloaliphatic; (3) up to $C_{18}$ aromatic; (4) up to $C_{18}$ heterocyclic; and (5) noninterfering halogen substituted products of said epoxy compound.

9. The tape of claim 7, wherein said hydroxy derivative moiety is derived from $C_3$–$C_{18}$ monohydroxy hydroxyepoxy compound containing one terminal hydroxy group.

10. The tape of claim 9, wherein said hydroxyepoxy compound is 2,3-epoxypropanol.

11. The tape of claim 2, wherein $R_1$ is said hydrocarbon moiety and is selected from the group consisting of:
 (1) ethylene;
 (2) propylene;
 (3) butylene;
 (4) hexylene;
 (5) dodecylene;
 (6) octadecylene;
 (7) tetracosylene;
 (8) phenylene;
 (9) piperazyl;
 (10) cyclohexylene; and
 (11) combinations thereof.

12. The tape of claim 2, wherein $R_2$ is said $C_6$–$C_{24}$ acyl and is selected from the group consisting of:
 (1) tetracosanoyl;
 (2) stearoyl;
 (3) lauroyl; and
 (4) hexanoyl.

13. A pressure-sensitive adhesive tape comprising a backing of paper, cloth, film or foil material, pressure-sensitive adhesive applied to one side of said backing, and a poly-N-acyl-imine release coating agent applied to the other side of said backing having the general structural formula:

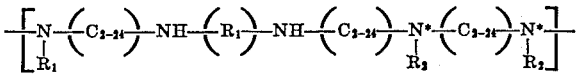

wherein:
 (1) the asterisks denote basic nitrogen atoms;
 (2) $R_1$ is ethylene;
 (3) $R_2$ is stearoyl and is bound to said basic nitrogen atoms in the range of 60%–100% of available basic nitrogen atoms; and,
 (4) the molecular weight of said agent is in the range of 300–1,000,000.

References Cited

UNITED STATES PATENTS 3,033,707  5/1962  Lacy et al. _____ 117—76
3,051,588  8/1962  Lavanchy _____ 117—68.5

WILLIAM D. MARTIN, Primary Examiner

B. PIANALTO, Assistant Examiner

U.S. Cl. X.R.

117—76, 122, 138.8, 144; 260—33.6